United States Patent
Aikawa et al.

(10) Patent No.: US 9,948,130 B2
(45) Date of Patent: Apr. 17, 2018

(54) POWER SUPPLY APPARATUS

(71) Applicant: CANON KABUSHIKI KAISHA, Tokyo (JP)

(72) Inventors: Iori Aikawa, Yokohama (JP); Katsuya Nakano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 14/856,494

(22) Filed: Sep. 16, 2015

(65) Prior Publication Data
US 2016/0087452 A1 Mar. 24, 2016

(30) Foreign Application Priority Data
Sep. 22, 2014 (JP) ................ 2014-193071

(51) Int. Cl.
| | | |
|---|---|---|
| H01F 27/42 | (2006.01) | |
| H01F 37/00 | (2006.01) | |
| H01F 38/00 | (2006.01) | |
| H02J 7/02 | (2016.01) | |
| H02J 50/10 | (2016.01) | |
| H04B 5/00 | (2006.01) | |
| G06F 1/26 | (2006.01) | |
| H02J 7/00 | (2006.01) | |
| H02J 50/80 | (2016.01) | |

(52) U.S. Cl.
CPC ............. *H02J 7/025* (2013.01); *H02J 50/10* (2016.02); *G06F 1/26* (2013.01); *H02J 50/80* (2016.02); *H02J 2007/0001* (2013.01); *H04B 5/00* (2013.01)

(58) Field of Classification Search
CPC .... H02J 5/005; H02J 5/00; H02J 17/00; H02J 7/025; H02J 7/00; H02J 7/02; H02J 7/0052; H02J 7/004; H02J 50/60; H02J 50/80; H04B 5/0037

USPC ...... 307/104, 149, 66, 64, 82; 375/135, 137; 250/395, 336.1; 370/311, 328, 329–333, 370/300–310; 713/300; 320/108, 109; 701/300
See application file for complete search history.

(56) References Cited

U.S. PATENT DOCUMENTS

| | | | | |
|---|---|---|---|---|
| 6,603,751 | B1 * | 8/2003 | Odenwalder | H04W 36/0072 370/331 |
| 8,463,536 | B2 * | 6/2013 | Yamamoto | B60L 11/182 701/300 |
| 8,836,279 | B2 | 9/2014 | Nakano | |
| 9,160,188 | B2 * | 10/2015 | Kang | H02J 7/025 |
| 9,654,182 | B2 * | 5/2017 | Tsukamoto | H02J 17/00 |
| 2009/0001932 | A1 * | 1/2009 | Kamijo | H02J 5/005 320/108 |
| 2009/0174364 | A1 * | 7/2009 | Onishi | H02J 7/025 320/108 |

(Continued)

FOREIGN PATENT DOCUMENTS

JP 2010-039283 A 2/2010

*Primary Examiner* — Fritz M Fleming
*Assistant Examiner* — Jagdeep Dhillon
(74) *Attorney, Agent, or Firm* — Fitzpatrick, Cella, Harper & Scinto

(57) ABSTRACT

A power supply apparatus includes a power supply unit that wirelessly supplies power to an electronic apparatus, a communication unit that performs a wireless communication with the electronic apparatus, and a control unit that controls a timing for switching a communication process performed by the communication unit and a power supply process performed by the power supply unit.

11 Claims, 9 Drawing Sheets

(56) References Cited

U.S. PATENT DOCUMENTS

| | | | | |
|---|---|---|---|---|
| 2011/0051780 A1* | 3/2011 | Kawasaki | ............... | H04B 1/40 375/135 |
| 2012/0223588 A1* | 9/2012 | Suzuki | ................... | H02J 5/005 307/104 |
| 2013/0140906 A1* | 6/2013 | Tanabe | ................... | H02J 17/00 307/104 |
| 2013/0154557 A1* | 6/2013 | Lee | ..................... | H04B 5/0037 320/108 |
| 2013/0342160 A1* | 12/2013 | Tanabe | ................... | H02J 5/005 320/108 |
| 2014/0021365 A1* | 1/2014 | Oda | ......................... | G01T 1/17 250/395 |
| 2014/0084701 A1* | 3/2014 | Bae | ........................ | H02J 5/005 307/104 |
| 2014/0183978 A1* | 7/2014 | Tanabe | ................... | H02J 7/025 307/149 |
| 2014/0292094 A1* | 10/2014 | Tsukamoto | ......... | H04B 5/0037 307/104 |
| 2014/0292095 A1* | 10/2014 | Tsukamoto | ......... | H04B 5/0037 307/104 |
| 2014/0333145 A1* | 11/2014 | Lee | ........................ | H02J 17/00 307/104 |
| 2014/0337643 A1* | 11/2014 | Tsukamoto | ............ | H02J 17/00 713/300 |
| 2014/0375139 A1* | 12/2014 | Tsukamoto | ............ | H02J 5/005 307/104 |
| 2015/0061398 A1* | 3/2015 | Kudo | .................. | H04B 5/0037 307/104 |
| 2016/0013658 A1* | 1/2016 | Kohara | .................. | H02J 50/12 307/104 |
| 2016/0288665 A1* | 10/2016 | Tsukamoto | ............ | H02J 5/005 |

* cited by examiner

POWER SUPPLY APPARATUS

BACKGROUND

Field of the Invention

The present invention relates to, for example, a power supply apparatus capable of supplying power wirelessly, and a method thereof.

Description of the Related Art

Recently, a power supply system including a power supply apparatus for wirelessly supplying power without any connection by a connector and an electronic apparatus which receives power wirelessly supplied from the power supply apparatus is known. An electronic apparatus which charges a battery by using power supplied from the power supply apparatus in this power supply system is known (Japanese Patent Laid-Open No. 2010-039283).

In Japanese Patent Laid-Open No. 2010-039283, however, a method of controlling a timing for switching an output power by which the power supply apparatus communicates with the electronic apparatus and an output power by which the power supply apparatus supplies power to the electronic apparatus has not been taken into consideration. Therefore, the power supply apparatus and the electronic apparatus cannot synchronize a timing for switching a power supply process and a communication process.

Also, in a case where the power supply apparatus supplies power to the electronic apparatus by communicating with the electronic apparatus by using a protocol complying with NFC (Near Field Communication) standard, a timing for switching a communication process and a power supply process changes in accordance with the communication mode of the electronic apparatus. This makes it necessary to take account of the timing for switching the power supply process and the communication process, so as to maintain compatibility even when the communication mode of the electronic apparatus changes.

SUMMARY

According to an aspect of the present invention, there is provided an apparatus and method for appropriately controlling a timing for switching a communication process and a power supply process.

According to an aspect of the present invention, there is provided a power supply apparatus comprising: a power supply unit that wirelessly supplies power to an electronic apparatus; a communication unit that performs a wireless communication with the electronic apparatus; and a control unit that controls a timing for switching a communication process performed by the communication unit and a power supply process performed by the power supply unit.

According to an aspect of the present invention, there is provided a method comprising: wirelessly supplying power to an electronic apparatus; performing a wireless communication with the electronic apparatus; and controlling a timing for switching a communication process performed by a communication unit and a power supply process performed by a power supply unit.

According to an aspect of the present invention, there is provided a non-transitory storage medium that stores a program for causing a computer to execute a method, the method comprising: wirelessly supplying power to an electronic apparatus; performing a wireless communication with the electronic apparatus; and controlling a timing for switching a communication process performed by a communication unit and a power supply process performed by a power supply unit.

Further features and aspects of the present invention will become apparent from the following description of exemplary embodiments.

BRIEF DESCRIPTION OF THE DRAWINGS

The drawings, which are incorporated in and constitute a part of the specification, illustrate exemplary embodiments, features, and aspects of the present invention.

DESCRIPTION OF THE EMBODIMENTS

Exemplary embodiments, features, and aspects of the present invention will be described below with reference to the drawings.

First Embodiment

System Configuration

Figure 1:
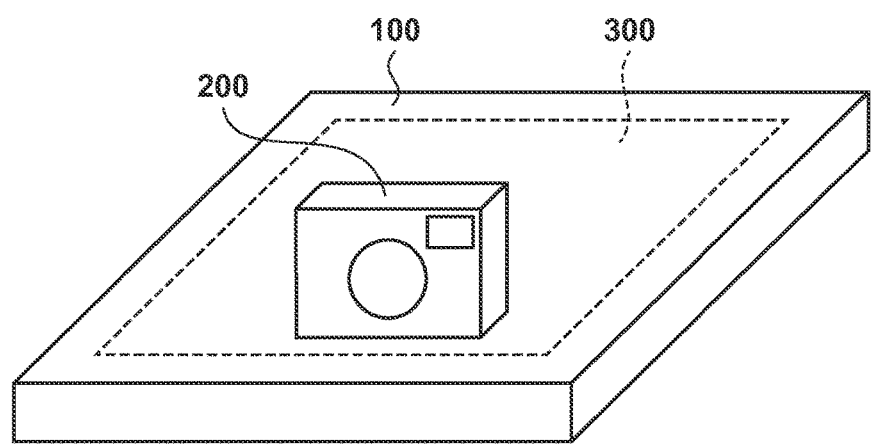
FIG. 1 is a diagram showing an example of a configuration of a power supply system in first embodiment.

First, a configuration of a power supply system of the first embodiment will be explained with reference to FIG. 1. As shown in FIG. 1, the power supply system of the first embodiment includes a power supply apparatus 100 and an electronic apparatus 200. In a case where the electronic apparatus 200 exists in a predetermined range 300 of the power supply apparatus 100, the power supply apparatus 100 wirelessly supplies power to the electronic apparatus 200. Also, in a case where the electronic apparatus 200 exists in the predetermined range 300 of the power supply apparatus 100, the electronic apparatus 200 can wirelessly receive power output from the power supply apparatus 100. In addition, in a case where the electronic apparatus 200 does not exist in the predetermined range 300, the electronic apparatus 200 cannot receive power from the power supply apparatus 100. The predetermined range 300 is a range within which the power supply apparatus 100 can communicate with the electronic apparatus 200. Note that the predetermined range 300 is a range on the housing of the power supply apparatus 100 in the first embodiment, but the first embodiment is not limited to this. Note also that the power supply apparatus 100 can wirelessly supply power to power receiving apparatuses. The power receiving apparatus herein mentioned is an apparatus capable of wirelessly receiving power from the power supply apparatus 100, and includes the electronic apparatus 200.

The electronic apparatus 200 can be an image capture apparatus or a reproducing apparatus, and can also be a communication apparatus such as a cell phone or a smartphone. The electronic apparatus 200 may also be a battery pack including a battery. Furthermore, the electronic apparatus 200 can be an automobile or a display, and can also be a personal computer.

Next, the power supply apparatus 100 of the first embodiment will be explained with reference to FIG. 2.

Figure 2:
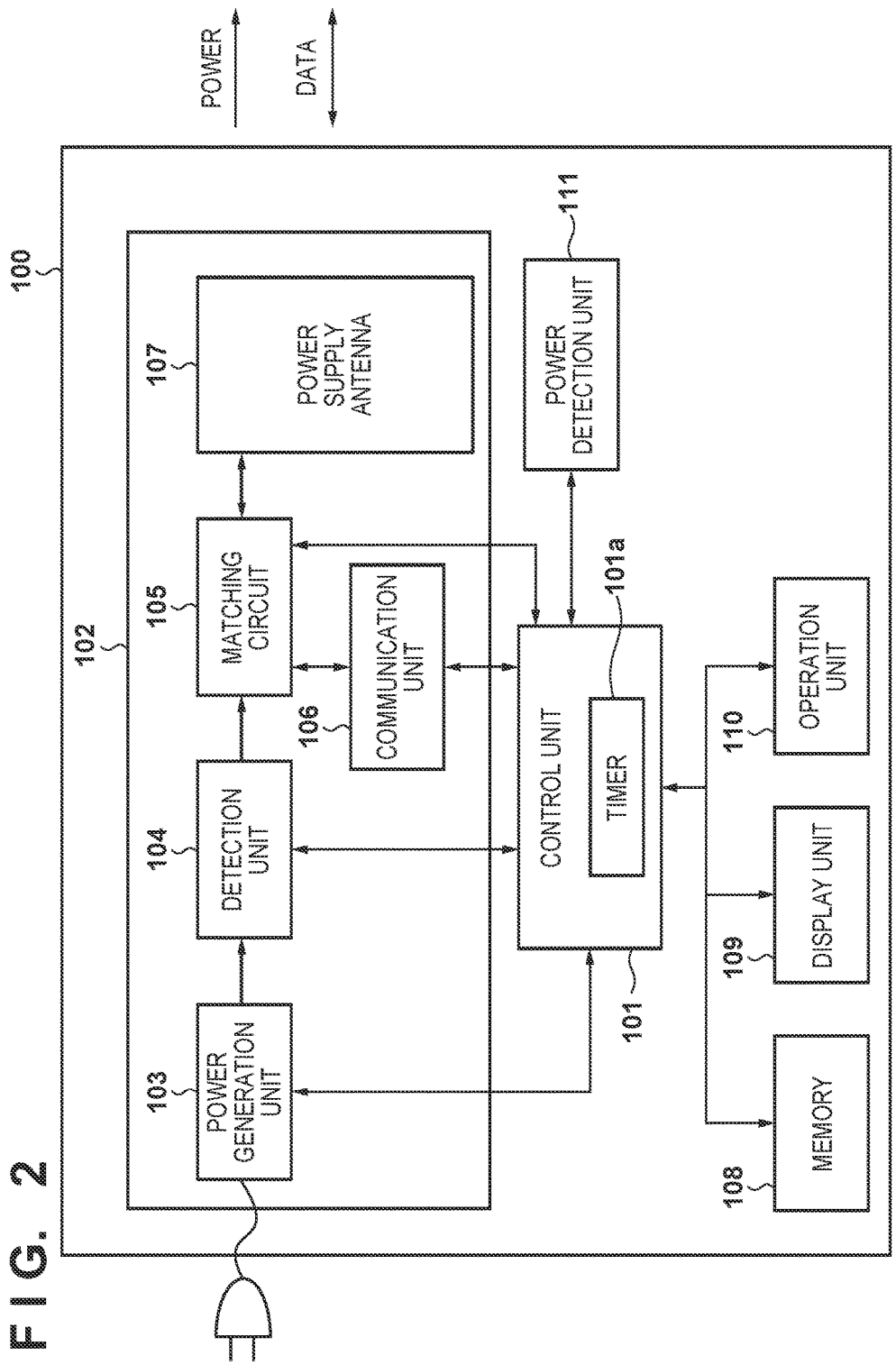
FIG. 2 is a block diagram showing an example of a power supply apparatus 100 in the first embodiment.

As shown in FIG. 2, the power supply apparatus 100 includes a control unit 101, a power supply unit 102, a memory 108, a display unit 109, an operation unit 110, and a power detection unit 111. The power supply unit 102 includes a power generation unit 103, a detection unit 104, a matching circuit 105, a communication unit 106, and a power supply antenna 107.

The control unit 101 controls the power supply apparatus 100 by executing a computer program stored in the memory 108. The control unit 101 includes, for example, a CPU (Central Processing Unit). The control unit 101 is formed by hardware. Also, the control unit 101 includes a timer 101a.

The power supply unit 102 is used to perform wireless power supply based on a predetermined power supply method. An example of the predetermined power supply method is a power supply method using a magnetic resonance method. The magnetic resonance method is a method of transmitting power from the power supply apparatus 100 to the electronic apparatus 200 in a state in which resonance is performed between the power supply apparatus 100 and the electronic apparatus 200. The state in which resonance is performed between the power supply apparatus 100 and the electronic apparatus 200 is a state in which the resonance frequency of the power supply antenna 107 of the power supply apparatus 100 matches that of a power receiving antenna 203 of the electronic apparatus 200. The predetermined power supply method may also be a power supply method using a method other than the magnetic resonance method.

The power generation unit 103 generates power to be output outside from the power supply antenna 107 by using power supplied from an AC power supply.

The power generated by the power generation unit 103 includes first power and second power. The first power is used by the communication unit 106 to communicate with the electronic apparatus 200. The first power is, for example, a very weak power of 1 W or less. Note that the first power may also be power defined by the communication standard of the communication unit 106. The second power is used by the electronic apparatus 200 to perform charging or a predetermined operation. The second power is, for example, a power of 2 W or more. Note that the second power is not limited to a power of 2 W or more as long as the power is higher than the first power. The control unit 101 sets the value of the second power.

The power generated by the power generation unit 103 is supplied to the power supply antenna 107 via the detection unit 104 and the matching circuit 105.

The detection unit 104 detects a VSWR (Voltage Standing Wave Ratio). In addition, the detection unit 104 supplies data indicating the detected VSWR to the control unit 101. The VSWR is a value indicating the relationship between the traveling wave of power output from the power supply antenna 107 and the reflected wave of power output from the power supply antenna 107. By using the data indicating the VSWR supplied from the detection unit 104, the control unit 101 can detect whether at least one power receiving apparatus exists in the predetermined range 300. Also, in a case where the second power is output from the power supply antenna 107, the control unit 101 can detect that the electronic apparatus 200 is removed from the predetermined range 300, or detect the presence/absence of a foreign body, by using the data indicating the VSWR supplied from the detection unit 104.

The matching circuit 105 includes a circuit for setting the resonance frequency of the power supply antenna 107.

In a case where the power supply apparatus 100 outputs one of the first power and the second power from the power supply antenna 107, the control unit 101 controls the matching circuit 105 to set the resonance frequency of the power supply antenna 107 at a predetermined frequency f. The predetermined frequency f is, for example, 13.56 MHz. The predetermined frequency f may also be 6.78 MHz, or a frequency defined by the communication standard of the communication unit 106.

The communication unit 106 performs near field wireless communication based on, for example, a communication protocol of NFC (Near Field Communication) standard defined by the NFC forum. The communication standard of the communication unit 106 may also be ISO/IEC 18092 standard, ISO/IEC 14443 standard, or ISO/IEC 21481 standard.

The communication unit 106 has a reader/writer (R/W) mode and a P2P (Peer To Peer) mode defined by NFC standard, as communication modes.

A case in which the communication unit 106 is in the reader/writer mode will be explained below.

The reader/writer mode corresponds to a card emulation mode defined by NFC standard. When the communication unit 106 is in the reader/writer mode, the communication unit 106 communicates with a power receiving apparatus in the card emulation mode based on NFC standard.

When the communication unit 106 is in the reader/writer mode, the communication unit 106 exchanges data corresponding to an NDEF (NFC Data Exchange Format) with a power receiving apparatus in the card emulation mode by using the first power.

Note that when the communication unit 106 is in the reader/writer mode, the communication unit 106 cannot communicate with a power receiving apparatus in the P2P mode.

When the communication unit 106 is in the reader/writer mode, the communication unit 106 does not exchange data corresponding to the NDEF with a power receiving apparatus in the card emulation mode via the power supply antenna 107, while the second power is output from the power supply antenna 107.

A case in which the communication unit 106 is in the P2P mode will now be explained.

When the communication unit 106 is in the P2P mode, the communication unit 106 communicates with a power receiving apparatus in the P2P mode based on NFC standard.

When the communication unit 106 is in the P2P mode, the communication unit 106 exchanges data corresponding to NDEF with a power receiving apparatus in the P2P mode by using the first power.

Note that when the communication unit 106 is in the P2P mode, the communication unit 106 does not exchange data corresponding to NDEF with a power receiving apparatus in the P2P mode via the power supply antenna 107, while the second power is output from the power supply antenna 107.

The power supply antenna 107 is an antenna for outputting one of the first power and the second power. The power supply antenna 107 is also used by the communication unit 106 to perform wireless communication using NFC standard.

A computer program for controlling the power supply apparatus 100 is stored in the memory 108. The memory 108 also stores identification data of the power supply apparatus 100, power supply parameters pertaining to the power supply apparatus 100, flags for controlling power supply, and the like. In addition, the memory 108 stores data received by the communication unit 106.

The display unit 109 displays image data supplied from the memory 108.

The operation unit 110 provides a user interface for operating the power supply apparatus 100. The operation unit 110 includes, for example, buttons, switches, and a touch panel for operating the power supply apparatus 100. The control unit 101 controls the power supply apparatus 100 in accordance with signals input via the operation unit 110.

The power detection unit 111 detects power output from the power supply antenna 107, and supplies data indicating the detected power to the control unit 101.

In the above explanation, the power supply apparatus 100 supplies wireless power. However, "wireless" can also be rephrased with "contactless" or "non-contact".

Figure 3:
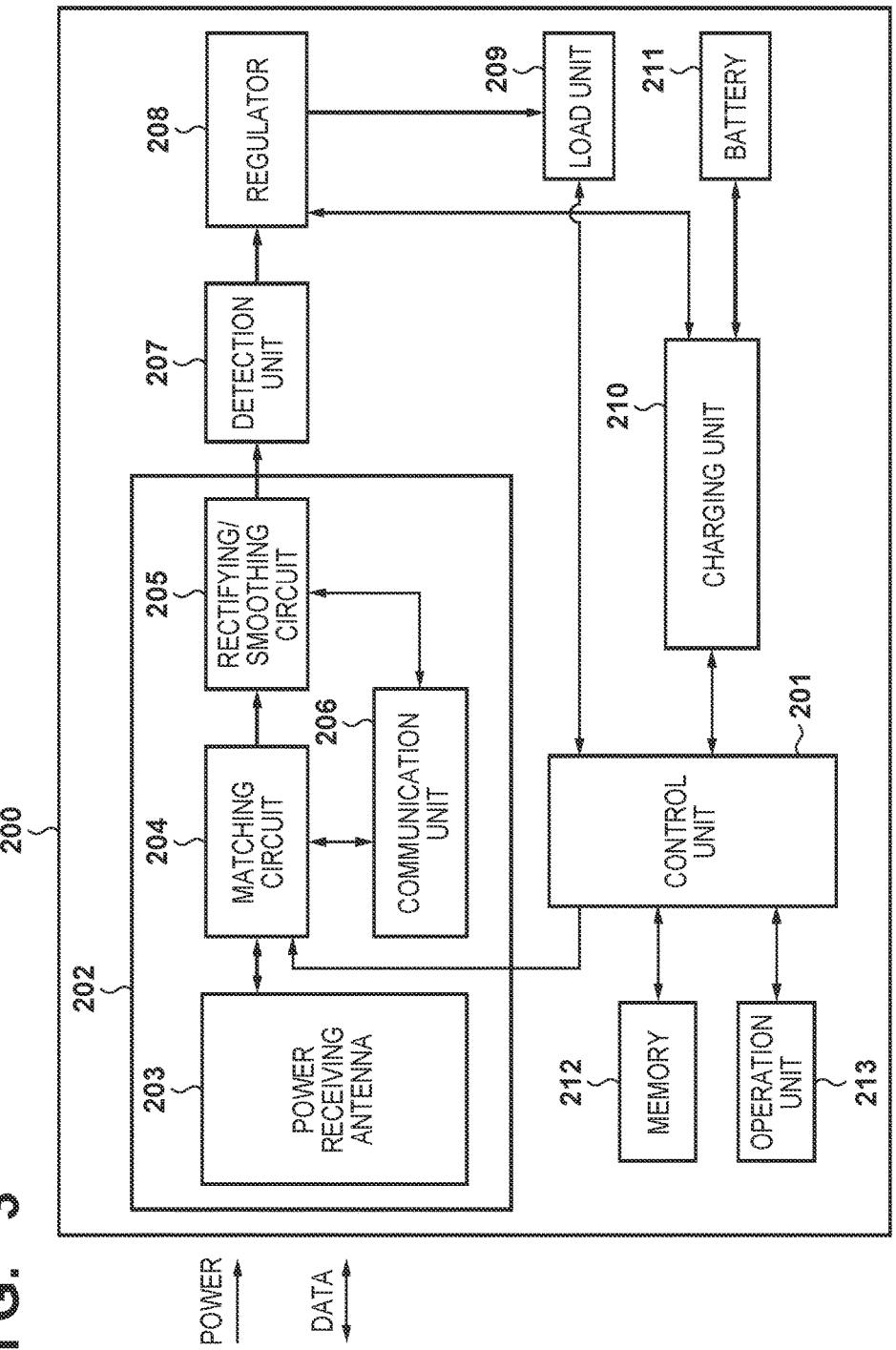
FIG. 3 is a block diagram showing an example of an electronic apparatus 200 in the first embodiment.

Next, a configuration of the electronic apparatus 200 of the first embodiment will be explained with reference to FIG. 3.

The electronic apparatus 200 includes a control unit 201, a power receiving unit 202, a detection unit 207, a regulator 208, a load unit 209, charging unit 210, a battery 211, a memory 212, and an operation unit 213. The power receiving unit 202 includes the power receiving antenna 203, a matching circuit 204, a rectifying/smoothing circuit 205, and a communication unit 206.

The control unit 201 controls the electronic apparatus 200 by executing a computer program stored in the memory 212. The control unit 201 includes, for example, a CPU. The control unit 201 is formed by hardware.

The power receiving unit 202 is used to wirelessly receive power from the power supply apparatus 100.

The power receiving antenna 203 is an antenna for receiving power supplied from the power supply apparatus 100. The power receiving antenna 203 is also used by the communication unit 206 to communicate with the power supply apparatus 100 by using NFC standard. The power received by the electronic apparatus 200 from the power supply apparatus 100 via the power receiving antenna 203 is supplied to the rectifying/smoothing circuit 205 via the matching circuit 204.

The matching circuit 204 includes a circuit for setting the resonance frequency of the power receiving antenna 203. The control unit 201 can set the resonance frequency of the power receiving antenna 203 by controlling the matching circuit 204. The matching circuit 204 includes a switch. The control unit 201 can select whether to supply power received by the power receiving antenna 203 to the rectifying/smoothing circuit 205 or the communication unit 206 by switching the switch of the matching circuit 204.

In a case where the control unit 201 controls the switch of the matching circuit 204 so as to supply power received by the power receiving antenna 203 to the rectifying/smoothing circuit 205, the rectifying/smoothing circuit 205 generates DC power from power received by the power receiving antenna 203. Also, the rectifying/smoothing circuit 205 supplies the generated DC power to the regulator 208 via the detection unit 207.

The communication unit 206 communicates with the power supply apparatus 100 based on the same communication standards as those of the communication unit 106 of the power supply apparatus 100.

In a case where the control unit 201 controls the switch of the matching circuit 204 so as to supply power received by the power receiving antenna 203 to the communication unit 206, the communication unit 206 analyzes data overlapped on power received by the power receiving antenna 203. After that, by using the analytical result of the data, the communication unit 206 transmits data requested by the power supply apparatus 100 to the power supply apparatus 100, or stores data received from the power supply apparatus 100. Furthermore, the communication unit 206 transmits response data corresponding to data supplied from the rectifying/smoothing circuit 205 to the power supply apparatus 100.

Note that the communication unit 206 has at least one of the card emulation mode and the P2P mode as a communication mode.

The detection unit 207 detects received power as power received via the power receiving antenna 203, and supplies the detected received power to the control unit 201.

The regulator 208 supplies at least one of power supplied from the rectifying/smoothing circuit 205 and power supplied from the battery 211 to each unit of the electronic apparatus 200 in accordance with an instruction from the control unit 201.

The load unit 209 includes, for example, an image capture unit for generating image data such as a still image or a moving image from an optical image of an object, and a reproducing unit for reproducing the image data.

When the electronic apparatus 200 is in a power-on mode, the regulator 208 supplies power to the load unit 209. When the electronic apparatus 200 is in a power-off mode or a standby mode, power supply from the regulator 208 to the load unit 209 is limited.

The charging unit 210 charges the battery 211. In accordance with an instruction from the control unit 201, the charging unit 210 controls whether to charge the battery 211 by using power supplied from the regulator 208, or to supply power discharged from the battery 211 to the regulator 208. The charging unit 210 periodically detects the remaining capacity of the battery 211, and supplies data indicating the remaining capacity of the battery 211 and data pertaining to charging of the battery 211 to the control unit 201.

The battery 211 is a secondary battery connectable to the electronic apparatus 200.

The memory 212 stores computer programs for controlling the electronic apparatus 200, and data such as parameters pertaining to the electronic apparatus 200.

The operation unit 213 provides a user interface for operating the electronic apparatus 200. The control unit 201 controls the electronic apparatus 200 in accordance with signals input via the operation unit 213.

Power Supply Control Process

A power supply control process to be performed by the power supply apparatus 100 of the first embodiment will be explained below with reference to FIG. 4. Note that this power supply control process shown in FIG. 4 can be implemented by the control unit 101 by executing a computer program stored in the memory 108.

In step S401, the control unit 101 transmits an authentication request to the electronic apparatus 200 existing in the predetermined range 300. That is, the control unit 101 transmits an authentication command to the electronic apparatus 200 by controlling the communication unit 106 by using a predetermined communication protocol. After the authentication request is transmitted by the control unit 101, the power supply control process advances from step S401 to step S402.

In step S402, the control unit 101 determines whether an authentication response is received from the electronic apparatus 200. The control unit 101 receives, via the communication unit 106, an authentication response signal generated by the control unit 201 in a case where the electronic apparatus 200 has succeeded authentication. This authentication response signal includes, for example, apparatus information of the electronic apparatus 200. The apparatus information includes identification information of the electronic apparatus 200, information indicating the function of the electronic apparatus 200, and the like, and also includes information indicating whether the electronic apparatus 200 is a power supply receivable apparatus. If there is no response from the electronic apparatus 200, the control unit 101 determines that no authentication response is received (NO in step S402). In this case (NO in step S402), the power supply control process returns from step S402 to step S401. If there is an authentication response from the electronic apparatus 200, the control unit 101 determines that the authentication response is received (YES in step S402). In this case (YES in step S402), the power supply control process advances from step S402 to step S403.

In step S403, the control unit 101 communicates with the electronic apparatus 200 via the communication unit 106, and confirms the conditions of power supply to the electronic apparatus 200. The conditions include, for example, whether to set the power supply apparatus 100 in the reader/writer mode or the P2P mode, and the magnitude of power to be supplied to the electronic apparatus 200. The control unit 101 transmits, to the electronic apparatus 200, information indicating the conditions of power supply to the electronic apparatus 200, and inquires the electronic apparatus 200 whether power supply corresponding to the conditions of power supply to the electronic apparatus 200 is possible. In this case, the electronic apparatus 200 transmits, to the power supply apparatus 100, information indicating the mode supported by the communication unit 206, information indicating whether the electronic apparatus 200 is an apparatus capable of receiving power, and information indicating power requested for the power supply apparatus 100. After that, the power supply apparatus 100 stores the information received from the electronic apparatus 200 in the memory 108. After the communication process in step S403 is performed, the power supply control process advances from step S403 to step S404.

In step S404, the control unit 101 determines whether power supply to the electronic apparatus 200 is possible by analyzing the data stored in the memory 108 via the communication unit 106 in step S403. If the control unit 101 determines that power supply from the power supply apparatus 100 to the electronic apparatus 200 is possible, the power supply control process advances from step S404 to step S405. If the control unit 101 does not determine that power supply from the power supply apparatus 100 to the electronic apparatus 200 is possible, the power supply control process is terminated.

In step S405, the control unit 101 confirms the communication mode of the communication unit 206 by analyzing the data stored in the memory 108 in step S403, thereby determining whether the communication unit 206 supports the reader/writer mode. If the communication mode of the communication unit 206 is the card emulation mode, the control unit 101 determines that the communication unit 206 supports the reader/writer mode, and the power supply control process advances from step S405 to step S406. In this case, the control unit 101 sets the communication unit 106 in the reader/writer mode. If the communication mode of the communication unit 206 is the P2P mode, the control unit 101 determines that the communication unit 206 does not support the reader/writer mode. If the control unit 101 does not determine that the communication unit 206 supports the reader/writer mode, that is, if the control unit 101 determines that the communication unit 206 supports the P2P mode, the power supply control process advances from step S405 to step S407. In this case, the control unit 101 sets the communication unit 106 in the P2P mode.

In step S406, the control unit 101 performs a first power supply process. The first power supply process will be described later. After the first power supply process is performed by the control unit 101, the power supply control process returns from step S406 to step S403.

In step S407, the control unit 101 performs a second power supply process. The second power supply process will be described later. After the second power supply process is performed by the control unit 101, the power supply control process returns from step S407 to step S401.

Figure 4:
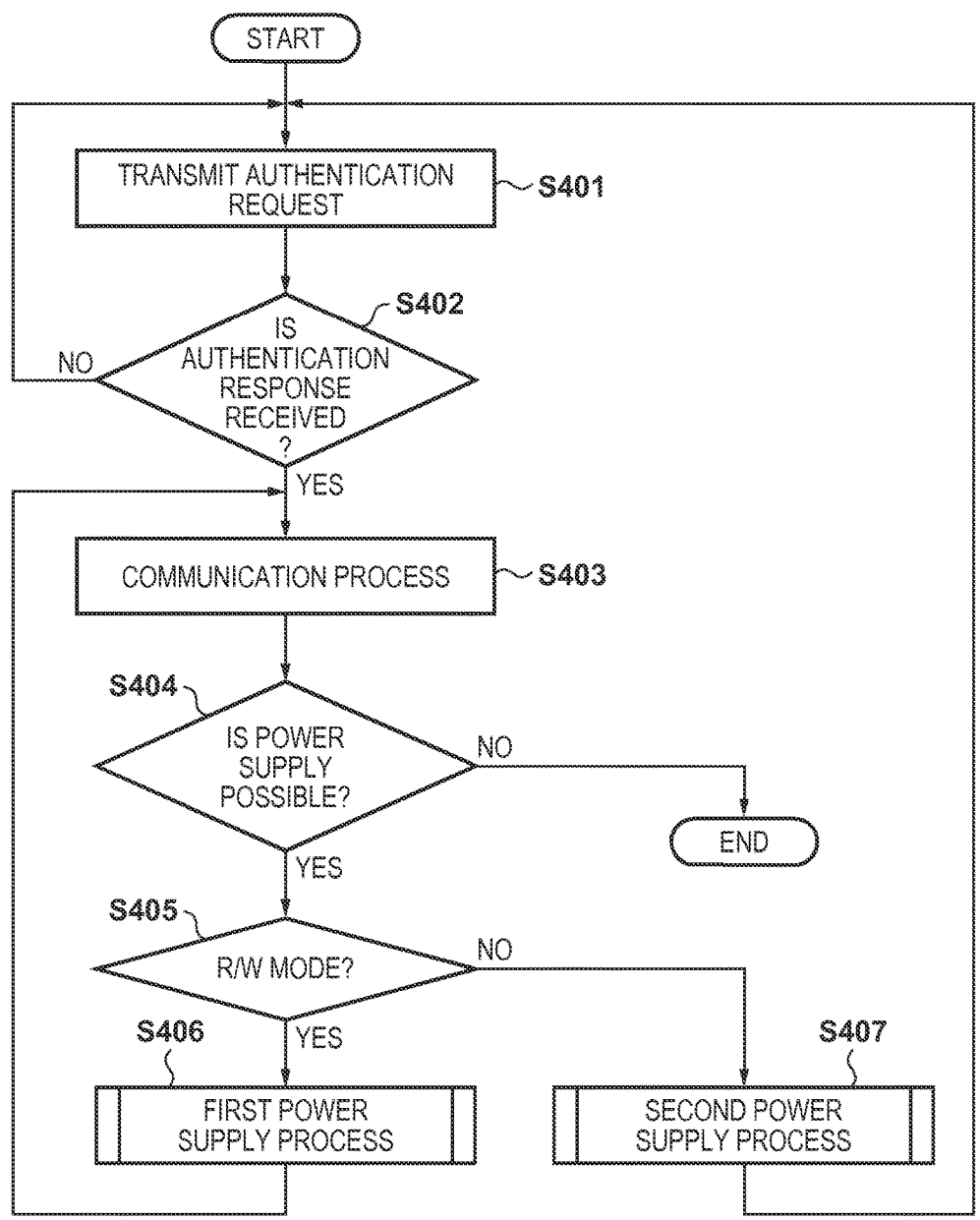
FIG. 4 is a flowchart showing an example of a power supply control process in the first embodiment.

Note that even when the power supply control process shown in FIG. 4 is terminated, if the power supply apparatus 100 is in the power supply mode, the control unit 101 periodically performs the power supply control process shown in FIG. 4. The power supply apparatus 100 periodically performs the power supply control process shown in FIG. 4 in order to perform power supply appropriate for the communication mode of the communication unit 206 even after the communication mode of the communication unit 206 is changed.

Power Reception Control Process

Figure 5:
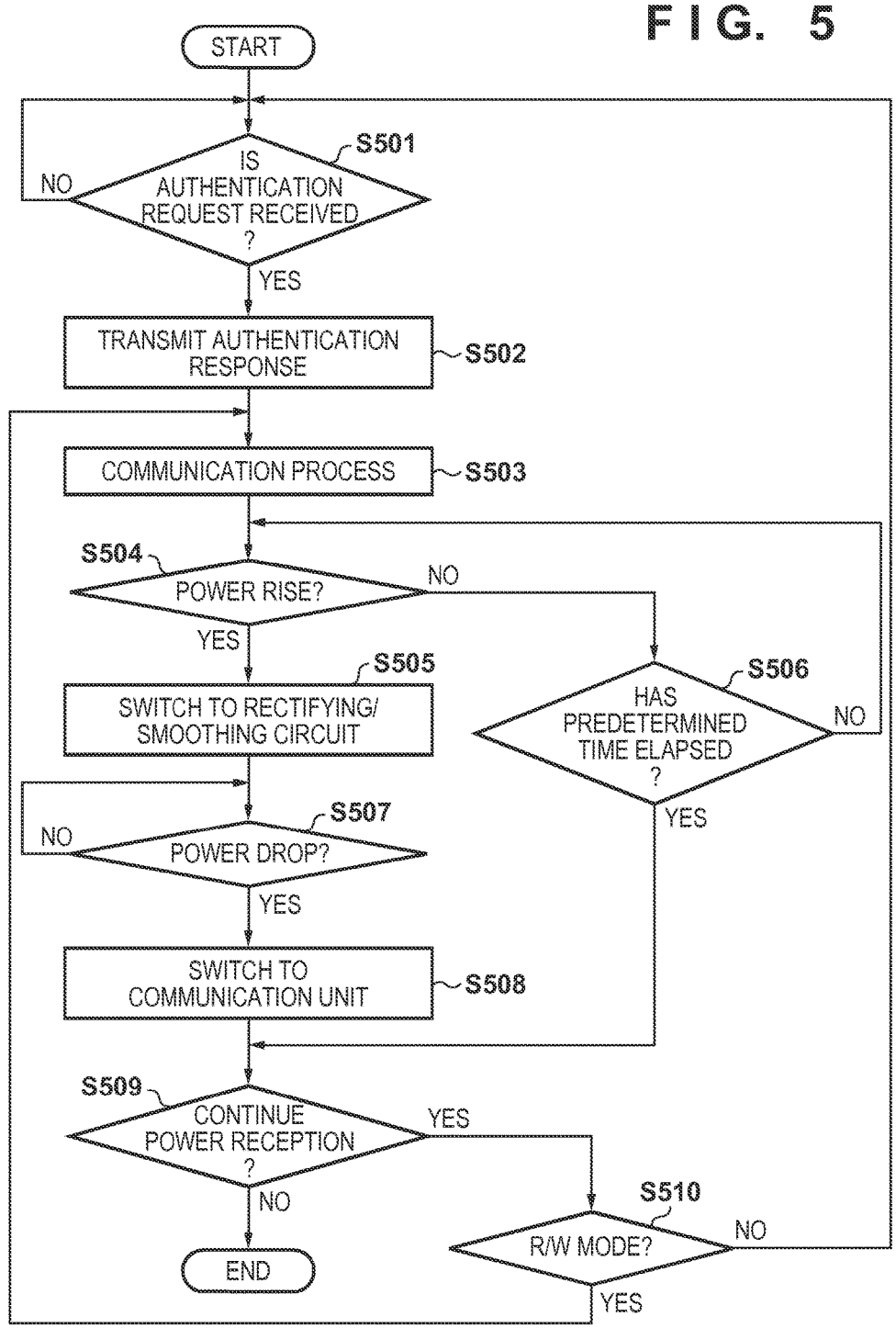
FIG. 5 is a flowchart showing an example of a power reception control process in the first embodiment.

A power reception control process to be performed by the electronic apparatus 200 of the first embodiment will be explained below with reference to FIG. 5. This power reception control process shown in FIG. 5 can be implemented by the control unit 201 by executing a computer program stored in the memory 212. Note that, in a case where the power reception control process shown in FIG. 5 is performed, the communication mode of the communication unit 106 of the power supply apparatus 100 is set in one of the read/writer mode and the P2P mode.

In step S501, the control unit 201 determines whether an authentication request is received from the power supply apparatus 100. For example, the control unit 201 determines whether an authentication command is received from the power supply apparatus 100 via the communication unit 206 by using a predetermined communication protocol. If the control unit 201 does not determine that the authentication request is received (NO in step S501), the power reception control process returns from step S501 to step S501. If the control unit 201 determines that the authentication request is received, the power reception control process advances from step S501 to step S502.

In step S502, the control unit 201 transmits an authentication response to the authentication request received from the power supply apparatus 100. That is, the control unit 201 transmits an authentication response signal generated by the control unit 201 when authentication is successful, to the power supply apparatus 100 via the communication unit 206. This authentication response signal includes, for example, apparatus information of the electronic apparatus 200. After the authentication response signal is transmitted to the power supply apparatus 100 by the control unit 201, the power reception control process advances from step S502 to step S503. Since the electronic apparatus 502 is an apparatus capable of receiving power, the apparatus information to be transmitted to the power supply apparatus 100 includes information indicating that the electronic apparatus 200 is an apparatus capable of receiving power.

In step S503, the control unit 201 performs a communication process with the power supply apparatus 100 via the communication unit 206. If the electronic apparatus 200 is capable of receiving power, the control unit 201 determines a power supply period t4 (to be described later), and transmits information indicating the power supply period t4 to the power supply apparatus 100. Also, the control unit 201 transmits, to the power supply apparatus 100, information indicating that the communication unit 206 of the electronic apparatus 200 supports the card emulation mode or the P2P mode, and writes the information in the memory 212. After the control unit 201 completes the communication process with the power supply apparatus 100, the power reception control process advances from step S503 to step S504.

In step S504, the control unit 201 determines whether received power detected by the detection unit 207 has exceeded the first power. That is, the control unit 201 determines whether power output from the power supply apparatus 100 is changed from the first power to the second power, in accordance with the received power detected by the detection unit 207. If the received power detected by the detection unit 207 has exceeded the first power, a rise of power output from the power supply apparatus 100 is detected, so the control unit 201 determines that power output from the power supply apparatus 100 is changed from the first power to the second power. If a rise of power output from the power supply apparatus 100 is detected, the power reception control process advances from step S504 to step S505. If the received power detected by the detection unit 207 has not exceeded the first power, no rise of power output from the power supply apparatus 100 is detected, so the control unit 201 does not determine that power output from the power supply apparatus 100 is not changed from the first power to the second power. If no rise of power output from the power supply apparatus 100 is detected, the power reception control process advances from step S504 to step S506.

In step S505, the control unit 201 controls the switch of the matching circuit 204 so that power received by the power receiving antenna 203 is not supplied to the communication unit 206. In this case, power received by the power receiving antenna 203 is supplied to the rectifying/smoothing circuit 205. In this case, the power reception control process advances from step S505 to step S507.

In step S506, the control unit 201 determines whether a predetermined time has elapsed by using an internal timer of the control unit 201. That is, the control unit 201 controls the internal timer of the control unit 201 so as to measure a time during which it is determined that no rise of power output from the power supply apparatus 100 is detected (NO in step S504) since the communication process in step S503 is terminated. If the time measured by the internal timer of the control unit 201 is equal to or longer than a predetermined time, the control unit 201 determines that no power supply is performed from the power supply apparatus 100. The predetermined time is a value determined in accordance with the operation frequency of the control unit 101, and is a few ten msec or more. For example, the predetermined time is longer than a period t1 (to be described later). If the time measured by the internal timer of the control unit 201 is equal to or longer than the predetermined time, the power reception control process advances from step S506 to step S509. If the time measured by the internal timer of the control unit 201 is shorter than the predetermined time, the power reception control process returns from step S506 to step S504.

In step S507, the control unit 201 determines whether the received power detected by the detection unit 207 is lower than the first power. That is, the control unit 201 determines whether power output from the power supply apparatus 100 is changed from the second power to the first power, in accordance with the received power detected by the detection unit 207. If the received power detected by the detection unit 207 is lower than the first power, a drop of power output from the power supply apparatus 100 is detected, so the control unit 201 determines that power output from the power supply apparatus 100 is changed from the second power to the first power. If a drop of power output from the power supply apparatus 100 is detected, the power reception control process advances from step S507 to step S508. If the received power detected by the detection unit 207 is not lower than the first power, no drop of power output from the power supply apparatus 100 is detected, so the control unit 201 determines that power output from the power supply apparatus 100 is not changed from the second power to the first power. If no drop of power output from the power supply apparatus 100 is detected, the power reception control process is repeated until the drop of power output from the power supply apparatus 100 is detected in step S507.

In step S508, the control unit 201 controls the switch of the matching circuit 204 so as to supply power received by the power receiving antenna 203 to the communication unit 206. In this case, the power received by the power receiving antenna 203 is not supplied to the rectifying/smoothing circuit 205. In this case, the power reception control process advances from step S508 to step S509.

In step S509, the control unit 201 determines whether to continuously receive power from the power supply apparatus 100. For example, the control unit 201 determines whether to continuously receive power from the power supply apparatus 100, in accordance with data indicating the remaining capacity of the battery 211 and data pertaining to charging of the battery 211 obtained from the charging unit 210. If the remaining capacity of the battery 211 is full charge, the control unit 201 does not determine to continuously receive power from the power supply apparatus 100. If the remaining capacity of the battery 211 is not full charge, the control unit 201 determines to continuously receive power from the power supply apparatus 100. If it is determined to continuously receive power from the power supply apparatus 100, the power reception control process advances from step S509 to step S510. If it is not determined to continuously receive power from the power supply apparatus 100, the power reception control process is terminated.

In step S510, the control unit 201 checks the communication mode of the communication unit 106. If the control unit 201 determines that the communication mode of the communication unit 106 is the reader/writer mode, the power reception control process returns from step S510 to step S503. If the control unit 201 does not determine that the communication mode of the communication unit 106 is the reader/writer mode, that is, if the control unit 201 determines that the communication mode of the communication unit 106 is the P2P mode, the power reception control process returns from step S510 to step S501.

Note that even when the power reception control process shown in FIG. 5 is terminated, if the electronic apparatus 200 is chargeable, the control unit 201 periodically performs the power reception control process shown in FIG. 5.

First Power Supply Process

Figure 6:
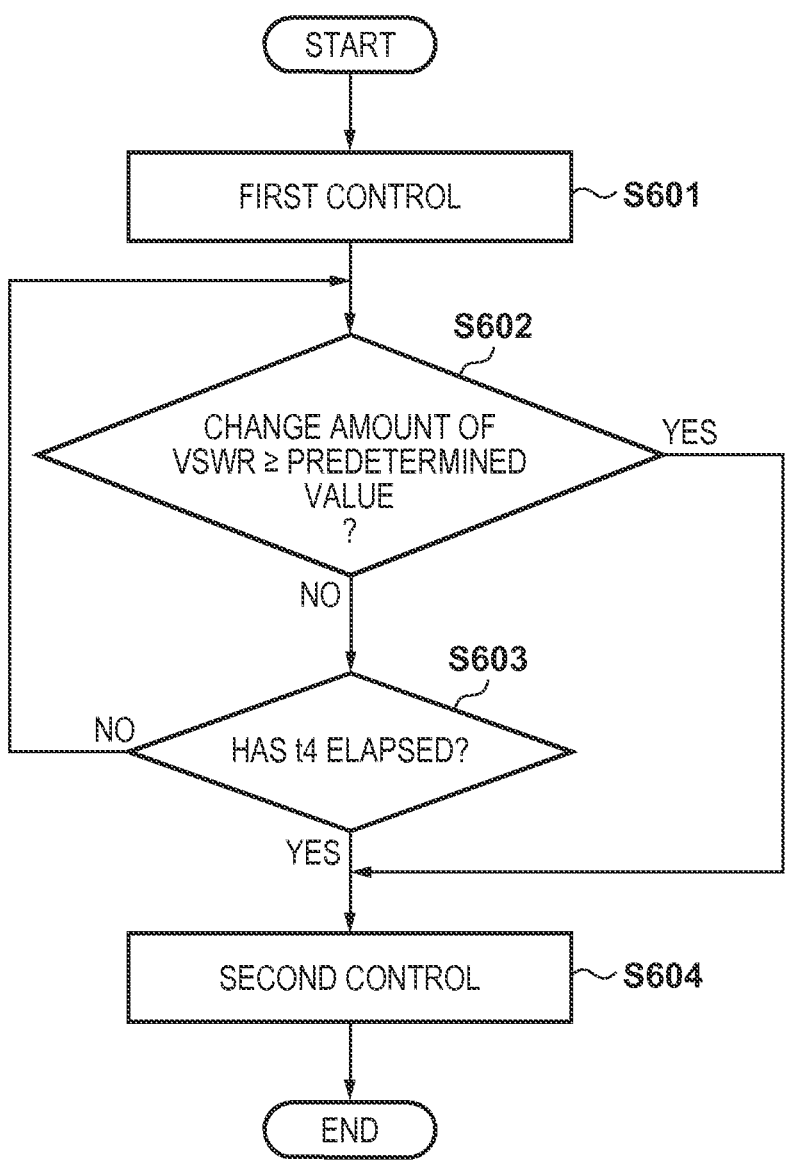
FIG. 6 is a flowchart showing an example of a first power supply process to be performed in the power supply control process shown in FIG. 4.
Figure 8:
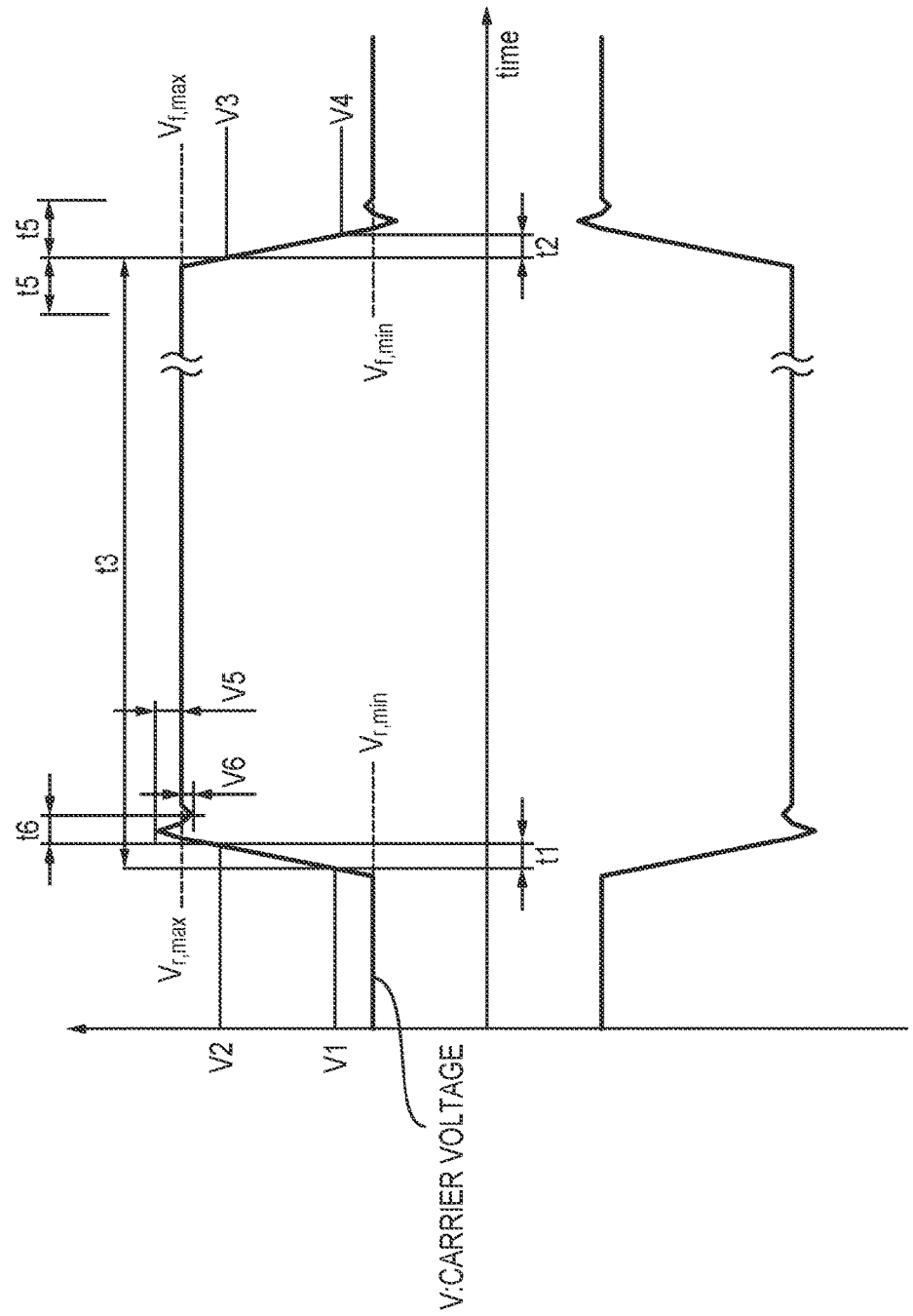
FIG. 8 is a timing chart showing examples of switching timings in the first power supply process shown in FIG. 6.

Next, the first power supply process performed in step S406 of FIG. 4 will be explained with reference to FIG. 6. The first power supply process can be implemented by the control unit 101 by executing a computer program stored in the memory 108. Note that, in a case where the first power supply process shown in FIG. 6 is performed, the communication mode of the communication unit 106 is set in the reader/writer mode. FIG. 8 shows an envelope waveform of a carrier voltage V output from the power supply antenna 107 in a case where the first power supply process shown in FIG. 6 is performed.

In step S601, the control unit 101 performs first control. The first control performed in step S601 is a process by which the control unit 101 controls the power generation unit 103 in order to control the magnitude of power to be transmitted from the power supply antenna 107. A case in which power to be output from the power supply antenna 107 is monotonically increased from the first power to the second power by the first control will be explained below. In this case, the carrier voltage V output from the power supply antenna 107 rises from a voltage Vr,min to a voltage Vr,max. The voltage Vr,min is a voltage in a case where the first power is output before the second power is output. The voltage Vr,max is a voltage in a case where the second power is output after the first power is output. The control unit 101 raises power to be output from the power supply antenna 107 so that a period during which the carrier voltage V to be output from the power supply antenna 107 changes from a voltage V1 to a voltage V2 falls within the first period t1. The voltage V1 is calculated by using equation (1) below. The voltage V2 is calculated by using equation (2) below.

$$V1 = Vr,min + 0.1(Vr,max - Vr,min) \quad (1)$$

$$V2 = Vr,max - 0.1(Vr,max - Vr,min) \quad (2)$$

The first period t1 in the first power supply process shown in FIG. 6 is about a few msec. For example, the first period t1 is 10 [msec] or less.

Also, the control unit 101 raises power to be output from the power supply antenna 107 so that an overshoot voltage V5 generated in a case where the output power changes falls within a value equal to 10% of a difference between the voltages Vr,max and Vr,min. In addition, the control unit 101 raises the output power so that a period from a timing at which the carrier voltage V exceeds the voltage V2 to a timing at which the magnitude of an overshoot or undershoot voltage becomes lower than a voltage V6 falls within a period t6. The voltage V6 is a value equal to 5% of the difference between the voltages Vr,max and Vr,min.

The period t6 is, for example, 5 [msec] or less. After the control unit 101 completes the first control, the first power supply process advances from step S601 to step S602. Note that the first period t1 may also be set in accordance with a time necessary for the control unit 101 to perform the process in step S505. Note also that the first period t1 may be set in accordance with a time necessary for the switch of the matching circuit 204 to switch the supply destinations of power received by the power receiving antenna 203 from the communication unit 206 to the rectifying/smoothing circuit 205.

In step S602, the control unit 101 determines whether the change amount of the VSWR detected by the detection unit 104 is equal to or larger than a predetermined value by using data indicating the VSWR supplied from the detection unit 104. That is, in step S602, the control unit 101 determines whether an apparatus other than the electronic apparatus 200 is placed in the predetermined range 300, in accordance with whether the change amount of the VSWR detected by the detection unit 104 is equal to or larger than the predetermined value. Also, in step S602, the control unit 101 determines whether the electronic apparatus 200 is removed from the predetermined range 300, in accordance with whether the change amount of the VSWR detected by the detection unit 104 is equal to or larger than the predetermined value. If the change amount of the VSWR detected by the detection unit 104 is equal to or larger than the predetermined value, the control unit 101 determines that another apparatus is placed or the electronic apparatus 200 is removed from the predetermined range 300. If the change amount of the VSWR detected by the detection unit 104 is not equal to or larger than the predetermined value, the control unit 101 determines that no other apparatus is placed and the electronic apparatus 200 is not removed from the predetermined range 300. If the change amount of the VSWR detected by the detection unit 104 is equal to or larger than the predetermined value, the first power supply process advances from step S602 to step S604. If the change amount of the VSWR detected by the detection unit 104 is not equal to or larger than the predetermined value, the first power supply process advances from step S602 to step S603.

In step S603, the control unit 101 determines whether the power supply period t4 has elapsed by using the timer 101a. Note that the power supply period t4 is a period in which the power supply antenna 107 outputs the second power. The control unit 101 controls the timer 101a to measure the time having elapsed since the first control is started in step S601. If the time measured by the timer 101a is equal to or longer than the power supply period t4, the first power supply process advances from step S603 to step S604. If the time measured by the timer 101a is shorter than the power supply period t4, the first power supply process returns from step S603 to step S602.

In step S604, the control unit 101 performs second control. The second control performed in step S604 is a process by which the control unit 101 controls the power generation unit 103 so as to control the magnitude of power to be transmitted from the power supply antenna 107. A case in which power to be output from the power supply antenna 107 is monotonically decreased from the second power to the first power by the second control will be explained below. In this case, the carrier voltage V output from the power supply antenna 107 drops from a voltage Vf,max to a voltage Vf,min. The voltage Vf,max is a voltage in a case where the second power is output before the first power is output. The voltage Vf,min is a voltage in a case where the first power is output after the second power is output. The control unit 101 drops the voltage such that a period during which the carrier voltage V to be output from the power supply antenna 107 changes from a voltage V3 to a voltage V4 falls within a second period t2. The voltage V3 is calculated by using equation (3) below. The voltage V4 is calculated by using equation (4) below.

$$V3 = Vf,max - 0.1(Vf,max - Vf,min) \quad (3)$$

$$V4 = Vf,min - 0.1(Vf,max - Vf,min) \quad (4)$$

The second period t2 in the first power supply process shown in FIG. 6 is about a few msec. For example, the second period t2 is 10 [msec] or less.

Assuming that a period during which the carrier voltage V exceeds the voltage V1 and becomes lower than the voltage V3 is a period t3, the control unit 101 drops the power such that the difference between the period t3 and power supply period t4 falls within a period t5. For example, the period t5 is 2 [msec] or less.

After the control unit 101 completes the second control, the first power supply process is terminated. Note that the second period t2 may also be set in accordance with a time required for the control unit 201 to perform the process in step S508. Note also that the second period t2 may be set in accordance with a time required for the switch of the matching circuit 204 to switch the supply destinations of power received by the power receiving antenna 203 from the rectifying/smoothing circuit 205 to the communication unit 206.

Second Power Supply Process

Figure 7:
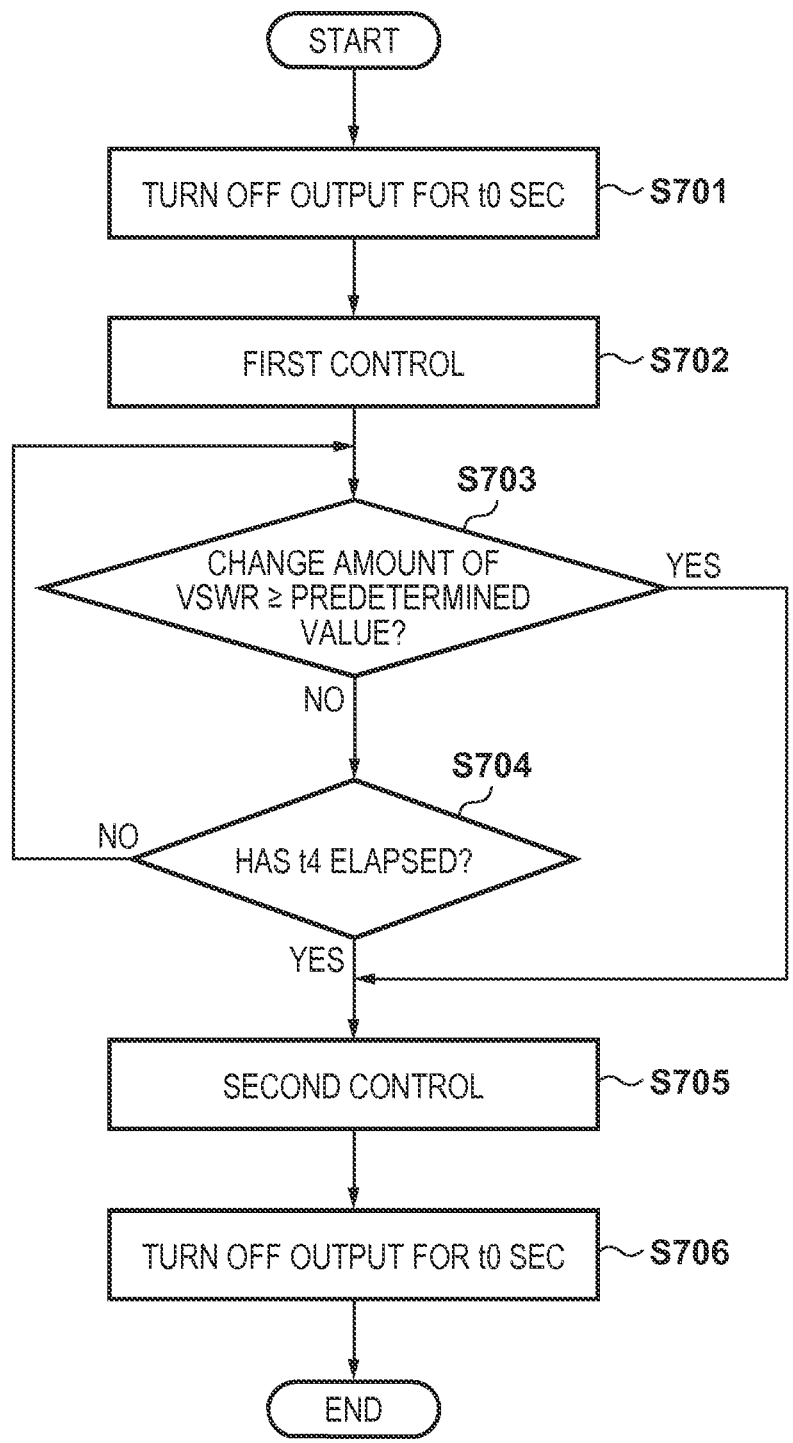
FIG. 7 is a flowchart showing an example of a second power supply process to be performed in the power supply control process shown in FIG. 4.
Figure 9:
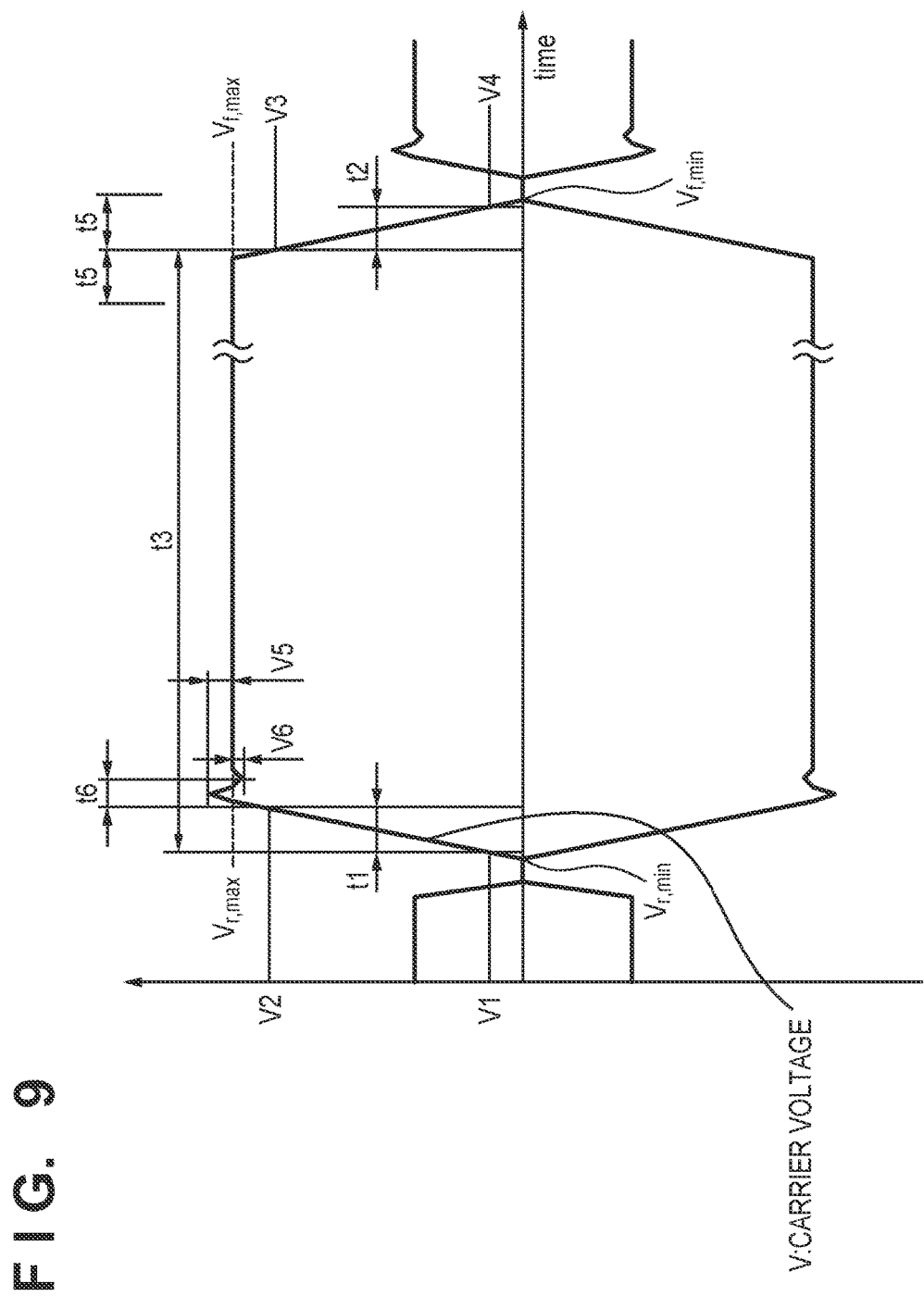
FIG. 9 is a timing chart showing examples of switching timings in the second power supply process shown in FIG. 7.

The second power supply process performed in step S407 of FIG. 4 will now be explained with reference to FIG. 7. The second power supply process can be implemented by the control unit 101 by executing a computer program stored in the memory 108. Note that, in a case where the second power supply process shown in FIG. 7 is performed, the communication mode of the communication unit 106 is in the P2P mode. FIG. 9 shows an envelope waveform of a carrier voltage V output from the power supply antenna 107 in a case where the second power supply process shown in FIG. 7 is performed.

In step S701, the control unit 101 controls the power generation unit 103 to limit power to be output from the power supply antenna 107 while at least a period t0 elapses. That is, in step S701, the control unit 101 controls the power generation unit 103 such that power to be output from the power supply antenna 107 becomes lower than the first power while at least the period t0 elapses. Also, in step S701, the control unit 101 controls the power generation unit 103 so as to stop power output from the power supply antenna 107 while at least the period t0 elapses. The period t0 is, for example, a few seconds. The period t0 may also be a reset period determined by the communication protocol of the communication unit 106. In this case, the second power supply process advances from step S701 to step S702.

In step S702, the control unit 101 performs first control. The first control performed in step S702 is a process by which the control unit 101 controls the power generation unit 103 so as to control the magnitude of power to be transmitted from the power supply antenna 107. A case in which power to be output from the power supply antenna 107 is monotonically increased from the first power to the second power by the first control will be explained below. In this case, the carrier voltage V output from the power supply antenna 107 rises from the voltage Vr,min to the voltage Vr,max. The voltage Vr,min is a voltage in a case where the output from the power supply antenna 107 is limited by the process in step S701 before the second power is output. The voltage Vr,max is a voltage in a case where the second power is output after the output from the power supply antenna 107 is limited by the process in step S701. The control unit 101 raises power so that a period during which the carrier voltage V to be output from the power supply antenna 107 changes from the voltage V1 to the voltage V2 falls within the first period t1. The voltage V1 is calculated by using equation (1) described above. The voltage V2 is calculated by using equation (2) described above.

The first period t1 in the second power supply process shown in FIG. 7 is about a few msec. For example, the first period t1 is 10 [msec] or less.

Also, the control unit 101 raises power to be output from the power supply antenna 107 so that the overshoot voltage V5 generated in a case where the output power changes falls within a value equal to 10% of a difference between the voltages Vr,max and Vr,min. In addition, the control unit 101 raises the output power so that a period from a timing at which the carrier voltage V exceeds the voltage V2 to a timing at which the magnitude of an overshoot or undershoot voltage becomes lower than the voltage V6 falls within the period t6. The voltage V6 is a value equal to 5% of the difference between the voltages Vr,max and Vr,min. The period t6 is, for example, 5 [msec] or less. After the control unit 101 completes the first control, the second power supply process advances from step S702 to step S703.

Note that the first period t1 may also be set in accordance with a time necessary for the control unit 201 to perform the process in step S505. Note also that the first period t1 may be set in accordance with a time necessary for the switch of the matching circuit 204 to switch the supply destinations of power received by the power receiving antenna 203 from the communication unit 206 to the rectifying/smoothing circuit 205.

In step S703, the control unit 101 performs the same control as in step S602. If the change amount of the VSWR detected by the detection unit 104 is equal to or larger than the predetermined value, the second power supply process advances from step S703 to step S705. If the change amount of the VSWR detected by the detection unit 104 is not equal to or larger than the predetermined value, the second power supply process advances from step S703 to step S704.

In step S704, the control unit 101 determines whether the power supply period t4 has elapsed by using the timer 101a. That is, the control unit 101 controls the timer 101a to measure the time having elapsed since the first control is started in step S702. If the time measured by the timer 101a is equal to or longer than the power supply period t4, the second power supply process advances from step S704 to step S705. If the time measured by the timer 101a of the control unit 101 is shorter than the power supply period t4, the second power supply process returns from step S704 to step S703.

In step S705, the control unit 101 performs second control. The second control performed in step S705 is a process by which the control unit 101 controls the power generation unit 103 so as to control the magnitude of power to be transmitted from the power supply antenna 107. A case in which power to be output from the power supply antenna 107 is monotonically decreased from the second power to the first power by the second control in step S705 will be explained below. In this case, the carrier voltage V output from the power supply antenna 107 drops from the voltage Vf,max to the voltage Vf,min. The voltage Vf,max is a voltage in a case where the second power is output before the output from the power supply antenna 107 is limited by the process in step S706 (to be described later). The voltage Vf,min is a voltage in a case where the output from the power supply antenna 107 is limited by the process in step S706 after the second power is output.

The control unit 101 drops the voltage such that a period during which the carrier voltage V to be output from the power supply antenna 107 changes from the voltage V3 to the voltage V4 falls within the second period t2. The voltage V3 is calculated by using equation (3) described above. The voltage V4 is calculated by using equation (4) described above.

The second period t2 in step S705 is about a few msec. For example, the second period t2 is 10 [msec] or less.

Assuming that a period during which the carrier voltage V exceeds the voltage V1 and becomes lower than the voltage V3 is the period t3, the control unit 101 drops the power such that the difference between the period t3 and power supply period t4 falls within the period t5. For example, the period t5 is 2 [msec] or less.

After the control unit 101 completes the second control, the second power supply process advances from step S705 to step S706. Note that the second period t2 may also be set in accordance with a time required for the control unit 201 to perform the process in step S508. Note also that the second period t2 may be set in accordance with a time required for the switch of the matching circuit 204 to switch the supply destinations of power received by the power receiving antenna 203 from the rectifying/smoothing circuit 205 to the communication unit 206.

In step S706, in the same manner as in step S701, the control unit 101 controls the power generation unit 103 such that power to be output from the power supply antenna 107 becomes lower than the first power while at least the period t0 elapses. Also, in step S706, the control unit 101 controls the power generation unit 103 so as to stop power output from the power supply antenna 107 while at least the period t0 elapses. In this case, the second power supply process is terminated.

In the power supply apparatus 100 in the first embodiment, the communication mode of the electronic apparatus 200 is detected, and a timing for switching a communication process with the electronic apparatus 200 and a power supply process to the electronic apparatus 200 is controlled in accordance with the communication mode of the electronic apparatus 200. Even when the communication mode of the electronic apparatus 200 is changed, therefore, the power supply apparatus 100 can control a timing for switching a power supply process and a communication process in the power supply apparatus 100. Accordingly, the power supply apparatus 100 can synchronize a timing for switching a power supply process and a communication process in the power supply apparatus 100 and a timing for switching a power supply and a communication process in the electronic apparatus 200.

Note that in the first embodiment, the power supply apparatus 100 supplies the second power to the electronic apparatus 200 by using the power supply antenna 107, and performs communication between the communication unit 106 and the electronic apparatus 200 by using the power supply antenna 107. However, the first embodiment is not limited to this.

For example, even when the power supply apparatus 100 includes an antenna for supplying the second power to the electronic apparatus 200 and an antenna for performing communication between the communication unit 106 and the electronic apparatus 200, the same effect as described above can be obtained by performing the processes shown in FIGS. 4, 6, and 7.

Also, the electronic apparatus 200 receives power from the power supply apparatus 100 by using the power receiving antenna 203, and performs communication between the power supply apparatus 100 and the communication unit 206 by using the power receiving antenna 203. However, the first embodiment is not limited to this. For example, the electronic apparatus 200 may also include an antenna for receiving power from the power supply apparatus 100, and an antenna for performing communication between the power supply apparatus 100 and the communication unit 206. In this case, the electronic apparatus 200 performs the process shown in FIG. 5.

Note that the communication unit 106 performs near field wireless communication in the above explanation, but near field wireless communication may also be rephrased with "short-range wireless communication".

Other Embodiments

The power supply apparatus according to the present invention is not limited to the power supply apparatus 100 explained in the first embodiment. For example, the power supply apparatus according to the electronic apparatus can also be implemented by a system including apparatuses. In addition, the electronic apparatus according to the present invention is not limited to the electronic apparatus 200 explained in the first embodiment. For example, the electronic apparatus according to the present invention can also be implemented by a system including apparatuses.

Furthermore, at least one of the various functions, processes, and methods described in the first embodiment can be achieved using a program. Hereinafter, in a second embodiment, a program for realizing at least one of the various functions, processes, and methods described in the first embodiment will be referred to as a "program X". Furthermore, in the second embodiment, a computer for executing the program X will be referred to as a "computer Y". Examples of the computer Y include a personal computer, a microcomputer, and a central processing unit (CPU).

At least one of the various functions, processes, and methods described in the first embodiment can be realized by the computer Y executing the program X. In this case, the program X is supplied to the computer Y via a computer readable storage medium. A computer readable storage medium in the second embodiment includes at least one of a hard disk device, a magnetic storage device, an optical storage device, a magneto-optical storage device, a memory card, a read only memory (ROM), and a random access memory (RAM). Furthermore, the computer readable storage medium in the second embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2014-193071, filed Sep. 22, 2014 which is hereby incorporated by reference herein in its entirety.

What is claimed is:

1. A power supply apparatus comprising:
a power supply unit that wirelessly supplies power to an electronic apparatus;
a communication unit that performs a wireless communication with the electronic apparatus; and
a control unit that controls a timing for switching a communication process performed by the communication unit and a power supply process performed by the power supply unit,
wherein the control unit controls power output from the power supply unit by using data received from the electronic apparatus by the communication unit, wherein the control unit has a first mode in which, after performing near field wireless communication with the electronic apparatus by the communication unit, the control unit performs first control which increases power output from the power supply unit, and second control which decreases power output from the power supply unit, wherein the control unit controls the power supply unit such that a period during which a displacement of output power which increases in the first control changes from a predetermined first proportion to a predetermined second proportion falls within a predetermined first period, wherein the control unit controls the power supply unit such that a period during which a displacement of output power which decreases in the second control changes from the predetermined second proportion to the predetermined first proportion falls within a predetermined second period, and wherein the control unit controls the power supply unit such that a period during which power output from the power supply unit is a third period determined based on the received data.

2. The apparatus according to claim 1, wherein the control unit monotonically increases power output from the power supply unit when the control unit perform the first control, and monotonically decreases power output from the power supply unit when the control unit performs the second control.

3. The apparatus according to claim 1, wherein the control unit has a second mode in which, after performing a wireless communication with the electronic apparatus by the communication unit, the control unit limits power output from the power supply unit for at least a predetermined period, wherein the control unit monotonically increases power output from the power supply unit when the control unit performs the first control, and monotonically decreases power output from the power supply unit when the control unit performs the second control, wherein the control unit limits power output from the power supply unit again for at least the predetermined period.

4. The apparatus according to claim 1, wherein the third period is a period from a timing at which the displacement of output power in the first control changes to the predetermined first proportion to a timing at which the displacement of output power in the second control changes to the predetermined second proportion, and wherein a difference between the third period and a predetermined power supply period falls within a fourth period.

5. The apparatus according to claim 1, wherein in the first control, the control unit performs control such that an overshoot which occurs in a case where power output from the power supply unit is monotonically increased falls within the first proportion of the displacement of output power in the first control.

6. The apparatus according to claim 1, wherein in the first control, the control unit performs control such that an overshoot which occurs in a case where power output from the power supply unit is monotonically increased falls within a period which falls within a predetermined third proportion of the displacement of output power in the first control.

7. The apparatus according to claim 3, further comprising:

a selection unit that selects whether to perform power supply in the first mode or the second mode, wherein the selection unit selects the first mode when performing power supply to the electronic apparatus in a reader/writer mode, and the second mode when performing power supply to the electronic apparatus in a P2P mode.

8. The apparatus according to claim 1, further comprising:

a detection unit that detects an impedance in a case where power is output from the power supply unit, wherein, in a case where power is output from the power supply unit, the control unit performs the second control if the detection unit detects a fluctuation in the impedance, which is not less than a predetermined value.

9. The apparatus according to claim 1, wherein the predetermined first proportion is 10%, the predetermined second proportion is 90%, and the predetermined third proportion is 5%.

10. A method for a power supply apparatus comprising:

wirelessly supplying power to an electronic apparatus;

performing a wireless communication with the electronic apparatus;

controlling a timing for switching a communication process performed by a communication unit and a power supply process performed by a power supply unit, controlling output from the power supply apparatus by using data received from the electronic apparatus by the communication process, after performing near field wireless communication with the electronic apparatus, performing first control which increases power output from the power supply apparatus and second control which decreases power output from the power supply apparatus, controlling the power supply apparatus such that a period during which a displacement of output power which increases in the first control changes from a predetermined first proportion to a predetermined second proportion falls within a predetermined first period, controlling the power supply apparatus such that a period during which a displacement of output power which decreases in the second control changes from the predetermined second proportion to the predetermined first proportion falls within a predetermined second period, and controlling the power supply apparatus such that a period during which power output from the power supply apparatus is a third period determined based on the received data.

11. A non-transitory storage medium that stores a program for causing a power supply apparatus to execute a method, the method comprising:

wirelessly supplying power to an electronic apparatus;

performing a wireless communication with the electronic apparatus;

controlling a timing for switching a communication process performed by a communication unit and a power supply process performed by a power supply unit, controlling output from the power supply apparatus by using data received from the electronic apparatus by the communication process, after performing near field wireless communication with the electronic apparatus, performing first control which increases power output from the power supply apparatus and second control which decreases power output from the power supply apparatus, controlling the power supply apparatus such that a period during which a displacement of output power which increases in the first control changes from a predetermined first proportion to a predetermined second proportion falls within a predetermined first period, controlling the power supply apparatus such that a period during which a displacement of output power which decreases in the second control changes from the predetermined second proportion to the predetermined first proportion falls within a predetermined second period, and controlling the power supply apparatus such that a period during which power output from the power supply apparatus is a third period determined based on the received data.

* * * * *